United States Patent [19]

Hall

[11] Patent Number: 4,955,230

[45] Date of Patent: Sep. 11, 1990

[54] ELIMINATION OF TURBULENCE FOR SILICON MICROMACHINED AIRFLOW SENSOR

[75] Inventor: Bryan C. Hall, Newport News, Va.

[73] Assignee: Siemens-Bendix Automotive Electronics L.P., Troy, Mich.

[21] Appl. No.: 390,597

[22] Filed: Aug. 7, 1989

[51] Int. Cl.[5] .................................................. G01F 1/68

[52] U.S. Cl. ................................ 73/204.21; 73/204.26

[58] Field of Search .................. 73/202, 202.5, 204.11, 73/204.21, 204.22, 204.25, 204.26

[56] References Cited

U.S. PATENT DOCUMENTS 4,856,328 8/1989 Johnson ............................ 73/204.21

*Primary Examiner*—Herbert Goldstein

*Attorney, Agent, or Firm*—George L. Boller; Russel C. Wells

[57] ABSTRACT

The sensor comprises a silicon sensing element on a ceramic substrate. A slot is provided in the substrate just ahead of the leading edge of the silicon so that some of the airflow that is flowing toward the leading edge surface of the silicon passes through the slot. This promotes a less turbulent flow over the sensing face of the silicon.

5 Claims, 1 Drawing Sheet

4 58 64 46 56 44 4
48 60 42
50 52 62 54

ELIMINATION OF TURBULENCE FOR SILICON MICROMACHINED AIRFLOW SENSOR

BACKGROUND AND SUMMARY OF THE INVENTION

This invention relates generally to mass airflow sensors, and more specifically it relates to the elimination of turbulence for a silicon micromachined airflow sensor.

In state-of-the-art electronically controlled fuel systems for automotive internal combustion engines, the measurement of airflow that is inducted into the engine's intake system is an input to the engine electronic control unit (ECU). One way of obtaining this measurement is by means of a mass airflow sensor located in a by-pass venturi in an airbody. One type of mass airflow sensor comprises a silicon micromachined sensing element mounted on a ceramic substrate. The sensing element is disposed in the airflow through the by-pass venturi and provides a signal that is indicative of mass airflow into the engine.

It has been observed that certain irregularities in the airflow measurements by such sensors can occur, and it has been discovered that these are attributable to leading edge turbulence at the silicon micromachined sensing element. The present invention is directed to a solution to this problem.

A principal aspect of the solution involves the creation of a slot through the ceramic substrate at the leading edge of the silicon sensing element that is disposed on the substrate. It is also desirable for the leading edge of the silicon sensing element to have a sharp corner that points generally toward the direction of airflow so as to encourage a portion of the flow to pass through the slot while another portion of the flow passes smoothly over the sensing surface of the sensing element. The smooth flow over the sensing surface of the sensing element reduces spurious fluctuations in the measurements that would otherwise occur due to turbulence. Accordingly, a meaningful improvement is attained through the exercise of relatively uncomplicated fabrication procedures.

The foregoing features, advantages, and benefits of the invention, along with additional ones, will be seen in the ensuing description and claims, which should be considered in conjunction with the accompanying drawings. The drawings disclose a presently preferred embodiment of the invention according to the best mode contemplated for practicing the invention.

DESCRIPTION OF THE PREFERRED EMBODIMENT

Figure 1:
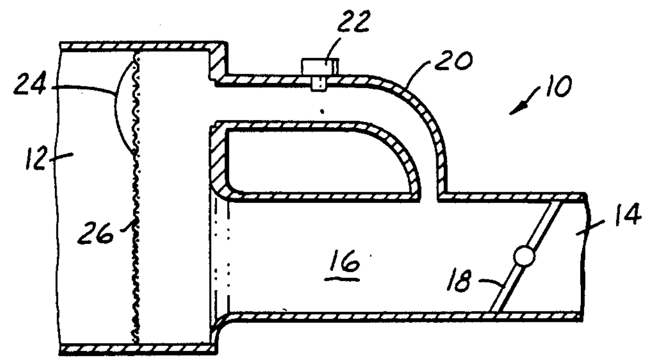
FIG. 1 is a longitudinal cross sectional view of a somewhat schematic nature through an internal combustion engine airbody containing a mass airflow sensor embodying principles of the present invention.
Figure 2:
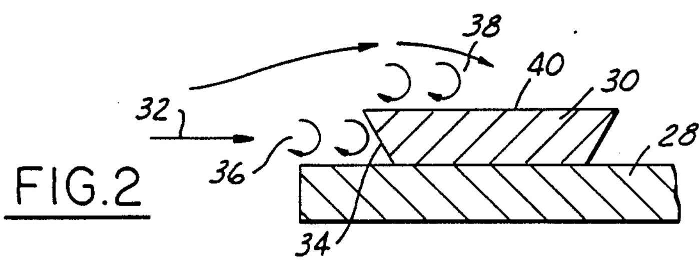
FIG. 2 is a longitudinal cross sectional view through a portion of an airflow sensor for the purpose of illustrating the problem that is solved by the invention.

FIG. 1 shows an airbody 10 containing an entrance end 12 and an exit end 14. The engine on which the airbody is mounted is not shown. The main airflow path 16 includes a throttle blade 18 that is operated to selectively restrict the airflow through the airbody. A by-pass venturi 20 is in parallel with path 16 upstream of throttle blade 18 and contains a mass airflow sensor 22 for measuring the airflow through the by-pass venturi. The flow through the by-pass venturi is representative of the total flow through the airbody, and therefore the measurement provided by sensor 22 is representative of total flow into the engine. As explained in the applicant's co-pending application Ser. No. 390,574, filed 8/7/89, and entitled "Dust Deflector For Silicon Mass Airflow Sensor", a deflector 24 is mounted on a screen 26 just upstream of the entrance to the by-pass venturi to prevent large dust particles from impacting the sensing element which is exposed in the airflow path without restricting flow through the by-pass venturi. A portion of the sensor that is disposed in the flow path through the by-pass venturi is shown in FIGS. 3 and 4, but before describing these Figs. in detail, reference is made to FIG. 2 for an explanation of the problem whose recognition is the basis for the present invention.

A typical sensor for measuring mass airflow comprises a ceramic substrate 28 on which is disposed a silicon sensing element 30. The direction of incident airflow is indicated by the arrow 32. When reference is hereinafter made to the direction of flow, it is to understood that this means the direction from which the flow is coming.

The sensing element has a leading edge 34 that faces into the airflow, and as a consequence, regions of turbulence, designated 36, 38, will occur at the sensing element 30. The flow across the flat sensing surface 40 is therefore disrupted, and as a consequence, an inconsistent output is generated by the sensor. While the sensor may exhibit some degree of accuracy, the turbulence is a source of inaccuracy, and its elimination will yield a more accurate sensor.

Figure 3:
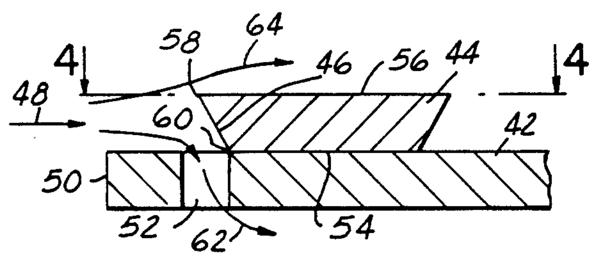
FIG. 3 is a view similar to FIG. 2 illustrating the solution of the problem by the invention.
Figure 4:
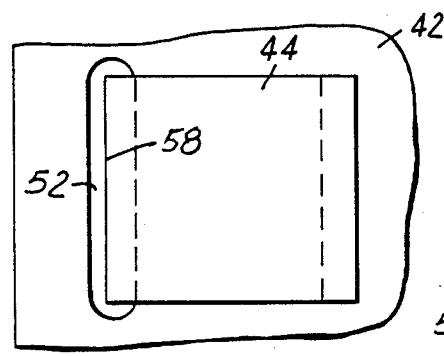
FIG. 4 is a view in the direction of arrows 4—4 in FIG. 3.

The sensor shown in FIGS. 3 and 4 represents a design that has significantly reduced turbulence, and hence better accuracy. In FIGS. 3 and 4, the sensor comprises a ceramic substrate 42 on which is disposed a silicon micromachined sensing element 44. Sensing element 44 has a leading edge 46 surface that faces the direction of airflow represented by the arrow 48. The leading edge surface 46 of sensing element 44 is downstream of the leading edge surface 50 of the substrate 42.

In accordance with principles of the invention, a slot 52 is provided through the thickness of substrate 42 just forward of the sensing element's leading edge surface 46. The length of slot 52 is substantially the same as the width of leading edge surface 46, and both are perpendicular to the direction of airflow.

The biggest surfaces of both the sensing element and the substrate are arranged to be generally parallel to the direction of flow. The leading edge surface 46 of the sensing element, while flat and transverse to the flow, is not at a right angle to the flat parallel surfaces 54, 56 respectively of the sensing element. It is however at a right angle to the flow as viewed in FIG. 4.

Surfaces 46 and 56 meet at a sharp, acute-angled corner 58 that points roughly in the direction of flow. Surfaces 46 and 54 meet at an obtuse-angled corner 60 that is essentially coincident with the trailing edge of slot 52. Accordingly, when the sensing element is exposed to flow, a portion of the flow is caused to flow through slot 52 (arrow 62) while another portion passes over surface 56 (arrow 64). The flow across surface 56, this surface being the sensing surface, experiences less turbulence than in the case of the sensor of FIG. 2 that lacked slot 52. Therefore, the accuracy of the sensor is enhanced by the inclusion of the slot.

Figure 5:
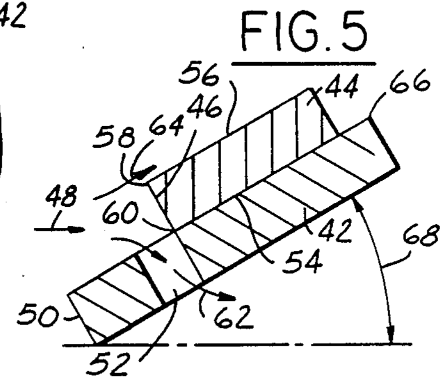
FIG. 5 is a view similar to FIG. 3, but of another embodiment of the invention.

FIG. 5 portrays another embodiment of sensor 66. This sensor is quite similar to that of FIGS. 3 and 4, and the same reference numerals are used to designate corresponding parts in the two embodiments. Sensor 66 differs in that the corners 58 and 60 of its sensing element's leading edge surface 46 are right angles, and the sensor is tipped at an acute angle 68 so that corner 58 points in the general direction of flow. Sensor 66 achieves the objective of less turbulent flow over sensing surface 56, and therefore more precision in its measurements of airflow.

While a presently preferred embodiment of the invention has been disclosed, it should be appreciated that principles are applicable to other embodiments.

What is claimed is:

1. In a solid-state mass airflow sensor comprising a substrate having a surface containing a semi-conductor sensing element, said semi-conductor sensing element having a leading edge surface in the direction of airflow and a flat exposed sensing surface extending downstream from said leading edge, the improvement which comprises a slot through said substrate just forward of and generally parallel with said leading edge surface so that a portion of the airflow toward said leading edge surface is caused to pass through said slot and thereby promote smooth flow over said exposed sensing surface to enhance the accuracy of the sensing element in measuring mass air flow.

2. The improvement set forth in claim 1 wherein the length of said leading edge surface and said slot are straight and substantially perpendicular to the flow.

3. The improvement set forth in claim 2 wherein said leading edge surface and said sensing surface join at a sharp corner and said leading edge surface is inclined at an acute angle to the direction of flow so that said corner points roughly in the direction of flow.

4. The improvement set forth in claim 3 wherein said leading edge surface and said sensing surface are at a right angle to each other, said sensing surface is parallel to said substrate, and both said sensing element and said substrate are inclined at an angle to the airflow.

5. The improvement set forth in claim 3 wherein said substrate and said sensing element are arranged to be parallel to the flow and said leading edge surface is arranged to be non-parallel to said sensing surface, said sharp corner at which said leading edge surface and said sensing surface join being acute-angled.

* * * * *